3,205,583
TAPE RULE PROCESS
Claude W. Purbaugh, Monrovia, Calif., assignor to H. K. Porter Company (Delaware), Danville, Va., a corporation of Delaware
Filed May 20, 1964, Ser. No. 368,916
3 Claims. (Cl. 33—137)

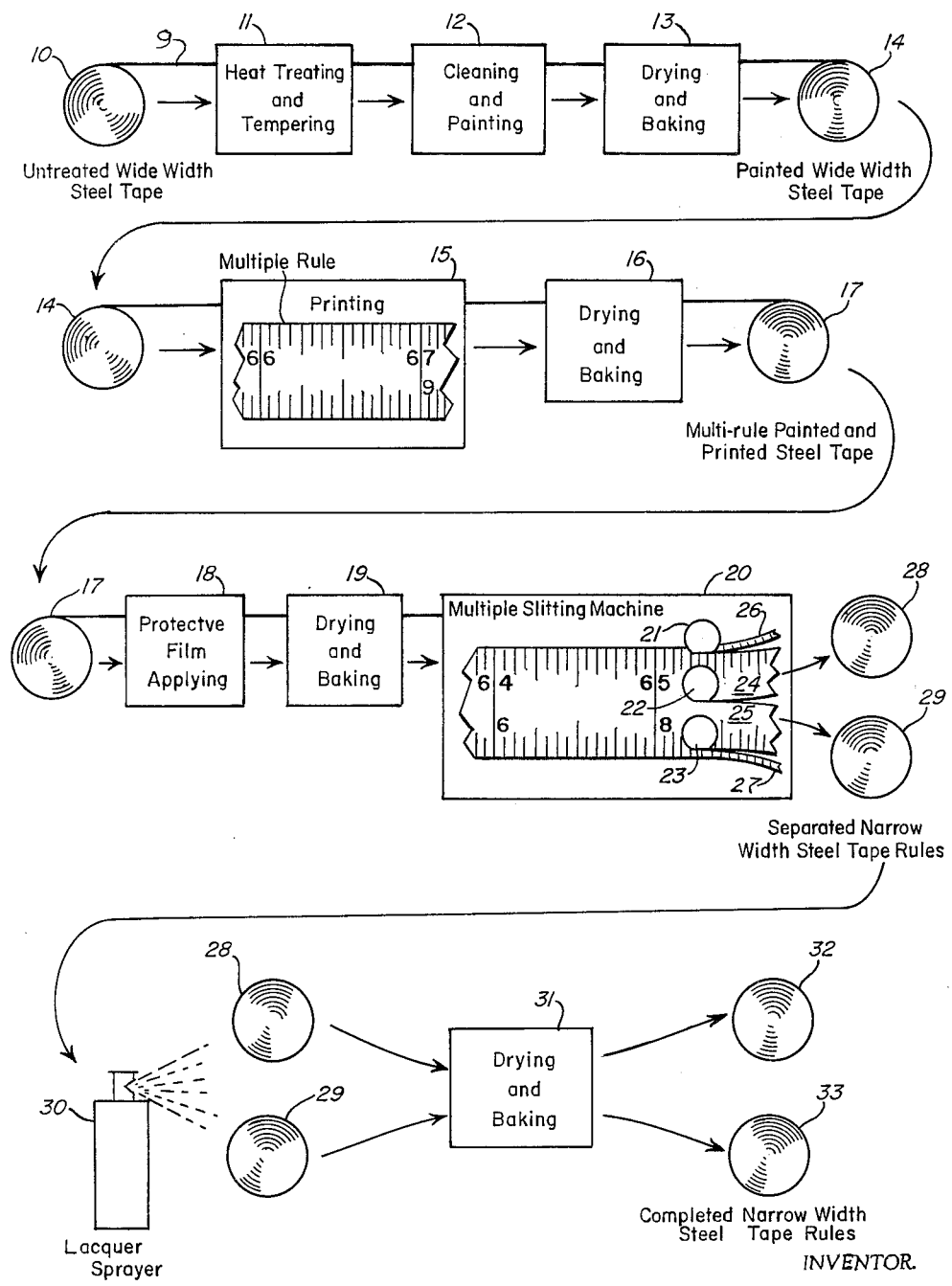

This invention relates to steel tape rule manufacturing and particularly to a process which adapts conventional wide width rule equipment to the manufacture of substantially narrow steel tape rules.

In the manufacture of steel tape rules continuous relatively long steel tape blades are used. These steel tape blades are unrolled from reels and pulled through several continuous processes including heat treating, painting, baking and printing. As the tape blades are pulled through the processes sufficient tension must be maintained by the pulling reels to prevent excessive sagging of the tape blades. If the tape blades sag excessively and touch the machinery through which the tape blades pass damage to the tape blade finish will occur. One defect caused by such a touching can cause rejection of as much as one hundred feet of processed material.

Machinery designed to handle a tape blade of a particular wide width cannot, unless substantially modified, be used to process a relatively narrow tape blade because the narrower tape blade does not have sufficient strength to withstand the tensions necessary to prevent sagging in the wider tape blade equipment. In order to have a continuous process, the end of one reel of steel tape is attached to the beginning of another reel of steel tape by a rivet or a spot weld. A tape substantially narrowed than the tape for which the machinery was designed does not permit placement of a rivet or spot weld of sufficient strength to withstand the tensions necessary to prevent sagging.

One method of manufacturing a narrower tape would be to acquire machines specially designed and constructed, having more sensitive clutches and brakes, to handle the narrower tape. This of course would require a large capital outlay. Another method would be to handle the narrower material in shorter lengths, thereby requiring less tension on the tape to prevent excessive sagging. This would be inefficient in that hand feeding of the machinery would be required, which would eliminate the continuous, efficient processes now used.

The object of the present invention is therefore to provide a process for manufacturing relatively narrow width rules on a continuous basis by utilizing to the greatest extent possible conventional equipment ordinarily adapted to the manufacture of only relatively wide width rules.

The present invention utilizes machinery designed to manufacture a particular width steel tape rule to produce substantially narrower rules by introducing the new steps of printing multiple rules on a single relatively wide steel tape and then employing a multiple slitting step after the normal processes to cut the wide steel tape into a plurality of narrow width steel tape rules. The added multiple rule printing and multiple slitting steps thus allow conventional steel tape rule machines and most of the conventional steel tape rule process steps to be used for the production of steel tape rules substantially narrower than the steel tape rules for which the machine were designed and for which they are conventionally employed.

The annexed drawing is a diagrammatic representation of an apparatus arrangement suitable for carrying out the process steps of the invention. The drawing shows for purposes of illustration and not to limit the invention, one sequence of process steps and one form of apparatus by which the invention may be carried out.

Referring to the drawing, steel tape 9 from a reel 10 of relatively wide width untreated steel tape is pulled through suitable heat treating and tempering apparatus 11 wherein the steel tape is heat treated and drawn to a hard temper comparable with clock springs. At this stage tape 9 may as an example be one-half inch wide and from this as later described there may be made two finished three-sixteenths inch width tapes.

The steel tape after being hardened is pulled through cleaning and painting equipment 12 wherein the tape passes through several cleaning and rinse tanks and is painted by continuously operating paint rollers. The painted steel tape is then pulled through a drying and baking oven 13 wherein the paint is dried and baked on the tape 9 following which the tape is wound to form a reel 14 of relatively wide width treated and painted steel tape.

Up to this stage in the process, the steps and equipment employed on the one-half inch starting width tape being used as an example may be conventional since the conventional equipment and process steps up to this stage adapt themselves to relatively wide widths such as the one-half inch width. The steps next to be described deal with converting the relatively wide width tape to a plurality of relatively narrow width tapes and in which there is employed the unconventional multiple rule printing and multiple slitting steps.

The relatively wide width painted steel tape is pulled from the reel 14 through multiple rule printing equipment 15 wherein multiple rules indicia, instead of the normal single rule indicia, are printed on the painted steel tape. That is, when the relatively wide width tape leaves the printing equipment 15 it will have imprinted on its face two separate sets of relatively narrow width indicia. Each set of indicia for reasons later made apparent is preferably set about one sixteenth of an inch in from the respective edge of the tape to which it is adjacent. The two sets of indicia are also preferably printed to read upscale in opposite directions though they may both be printed to read in the same direction.

The multiple printed tape is next pulled through a drying and baking equipment 16 wherein the ink is dried and baked on the tape following which the steel tape which now bears the two sets of indicia is wound to form the reel 17. Reel 17 is in turn pulled through a protective film applying equipment 18 wherein a suitable applicator deposits a clear protective film on the multi-printed steel tape which next passes through the drying and baking equipment 19.

Because of the camber introduced when a tape is slit in the middle, it has been found necessary to provide special slitting equipment in order to split the relatively wide tape having the two sets of narrow width rule indicia into two non-cambered narrow width tapes. That is, in order to produce two relatively narrow width tapes without having an objectionable camber in each, it is necessary to compensate for the camber effect at the time the relatively wide width tape is split into halves. In particular, it has been found that if two relatively narrow strips are taken off each outside edge of the wide tape as scrap simultaneous with splitting the tape in the middle, that the resulting two narrow width tapes will each be without objectionable camber.

The described multiple splitting is shown schematically by noting that the tape is pulled through a slitting machine 20 which uses cutting blades 21, 22 and 23, all cutting simultaneously, to produce two relatively narrow width steel rules 24 and 25 and two scrap pieces 26 and 27. More specifically, cutting blade 22 cuts the tape into separate rules 24 and 25, cutting blade 21 cuts a relatively narrow scrap piece 26 and cutting blade 23 cuts a relatively narrow scrap piece 27. The described scrap cuts have been found to balance out camber deformation caused by the shearing action of the principal cutting blade 22. For example, starting with a one-half inch width, if scrap pieces 26 and 27 are each one-sixteenth inch wide, rules 24 and 25 will each be three-sixteenth inch wide and without camber. Following splittings, the separate rule 24 and 25 are then tightly would to form coils of narrow width steel rules 28 and 29.

Since the splitting step leaves unpainted edges, a lacquer sprayer 30 is employed to spray a clear film on the edges of the coils 28, 29 of narrow width steel rules following which the coils 28, 29 are placed in a drying and baking equipment 31 wherein the lacquer is dried and baked on the coils. As a final step so far as the present method is concerned, the completed steel tape rules are coiled into coils 32 and 33 in which form they are ready for the final conventional manufacturing processes during which each of the coils 32 and 33 will be cut laterally between each successive indicia to form the final rule products.

In summary, the method of the invention by incorporating the steps of multiple printing and multiple slitting, makes practical a continuous method of manufacturing narrow width tape rules. In a broader sense the method of the invention applies to any width rule and provides a method for manufacturing a plurality of steel tape rules of given width from a steel tape of a width sufficient to provide the combined width of the rules and the required camber compensating scrap. Of equal importance is the fact that the rule manufacturer is enabled to utilize almost all of his conventional wide-width rule equipment. While a specific example has been set forth it should be understood that the same is only by way of example and not as a limitation of the claims hereinafter set forth.

Having described my invention, what I claim is:

1. In the process of manufacturing steel tape rules, in combination, the steps of printing pairs of narrow width rule indicia on a previously tempered and painted steel tape; of performing a first slitting of said printed tape between said pairs of indicia; of simultaneously with said first slitting performing a second slitting along each outer edge of said indicia whereby to compensate for any deformation produced by said first slitting; and of applying a protective coating on the edges exposed by said first and second slitting whereby to produce a separate undeformed narrow width rule for each said indicia.

2. In the process of manufacturing relatively narrow tape rules, in combination, the steps of printing a pair of narrow tape rule indicia on a relatively wide steel tape; of slitting said tape in the middle to form a pair of said narrow tape rules; and of simultaneously slitting said tape slightly in from each edge thereof to compensate for the deformation produced by said middle slitting.

3. In the process of manufacturing tape rules, in combination, the steps of printing a plurality of tape rule indicia on a previously heat treated and painted steel tape having a width in excess of the combined width of said indicia; of slitting said printed tape between each pair of said indicia; and of simultaneously with said first slitting performing further second slitting whereby to remove as scrap strips certain predetermined portions of said tape to compensate for any deformation produced by said first slitting whereby to produce from said tape a plurality of separate undeformed rules for each said indicia.

No references cited.

ROBERT E. PULFREY, *Primary Examiner.*